United States Patent
Moyo, III

(10) Patent No.: US 12,029,994 B2
(45) Date of Patent: Jul. 9, 2024

(54) CHILDREN'S SHOE WITH MOTORIZED ACCESSORY SYSTEM

(71) Applicant: Mtinima Marcus Moyo, III, Elizabeth, NJ (US)

(72) Inventor: Mtinima Marcus Moyo, III, Elizabeth, NJ (US)

(*) Notice: Subject to any disclaimer, the term of this patent is extended or adjusted under 35 U.S.C. 154(b) by 869 days.

(21) Appl. No.: 17/062,334

(22) Filed: Oct. 2, 2020

(65) Prior Publication Data
US 2022/0105439 A1  Apr. 7, 2022

(51) Int. Cl.
*A63H 18/14* (2006.01)
*H02J 7/00* (2006.01)
*H02K 7/116* (2006.01)

(52) U.S. Cl.
CPC ............ *A63H 18/14* (2013.01); *H02J 7/0042* (2013.01); *H02K 7/116* (2013.01)

(58) Field of Classification Search
CPC .......................... A63H 18/14; A63H 2018/165
See application file for complete search history.

(56) References Cited

U.S. PATENT DOCUMENTS

| | | | | |
|---|---|---|---|---|
| 3,441,277 A | * | 4/1969 | Winn ...................... | A63F 9/143 463/59 |
| 3,552,322 A | * | 1/1971 | Clowes .................. | A63H 18/14 463/68 |
| 4,799,916 A | * | 1/1989 | McKay ................... | A63H 18/14 105/29.2 |
| 4,917,644 A | * | 4/1990 | Sunshine ............... | A63H 33/26 446/26 |
| 5,316,514 A | * | 5/1994 | Ellman ................. | A63H 17/008 446/26 |

(Continued)

FOREIGN PATENT DOCUMENTS

| | | | |
|---|---|---|---|
| GB | 2290721 A | * 1/1996 | ............... A63F 9/14 |
| KR | 101382963 B1 | * 10/2013 | |

(Continued)

OTHER PUBLICATIONS

Translation KR102120597B1 (Year: 2020).*
Translation KR101382963B1 (Year: 2014).*

*Primary Examiner* — Eugene L Kim
*Assistant Examiner* — Alyssa M Hylinski
(74) *Attorney, Agent, or Firm* — Michael L. Greenberg, Esq.; Greenberg & Lieberman, LLC

(57) ABSTRACT

A footwear accessory apparatus and system disposed on and within shoes to facilitate movement of one or more accessories around a pre-established track via an electric motor is described. The track is equipped with an internal chain drive disposed in communication with the motor via at least one gear. Accessories are preferably mounted to the chain via at least one magnet which protrudes through a top of the track via a groove. A remote control is preferably configured to enable the user to command the movement of the accessories around the track of each shoe independently. The remote is equipped with a speaker to facilitate the playback of audio and sound effects pertinent to the movement of the accessory. Accessories may be also equipped with internal batteries to facilitate the illumination of interior lights and/or headlights of the accessory.

15 Claims, 8 Drawing Sheets

(56) References Cited

U.S. PATENT DOCUMENTS

| | | | | |
|---|---|---|---|---|
| 5,376,037 | A * | 12/1994 | Finkbeiner | A63H 18/14 446/236 |
| 6,383,098 | B1 * | 5/2002 | Haumschilt | A63B 65/127 273/DIG. 18 |
| 6,681,504 | B2 * | 1/2004 | Kinan | A43B 23/24 36/137 |
| 6,824,441 | B1 * | 11/2004 | Wiggs | A63H 33/26 446/136 |
| 8,266,828 | B2 * | 9/2012 | Strong | A63H 3/003 446/221 |
| 8,919,776 | B2 * | 12/2014 | Bellone | A43B 3/36 273/DIG. 18 |
| 9,055,778 | B1 * | 6/2015 | Kelley | A43B 23/026 |
| 2003/0017782 | A1 * | 1/2003 | Man | A63H 18/08 446/431 |
| 2005/0223601 | A1 * | 10/2005 | Dabah | A43B 3/30 36/137 |
| 2007/0164521 | A1 * | 7/2007 | Robinson | A43B 5/16 280/11.19 |
| 2008/0139080 | A1 * | 6/2008 | Zheng | A63H 3/28 446/268 |
| 2010/0248587 | A1 * | 9/2010 | Guzman | A63H 17/00 36/103 |
| 2013/0276334 | A1 * | 10/2013 | Bellone | A63F 9/001 36/136 |
| 2014/0315471 | A1 * | 10/2014 | Hudimac, Jr. | A63H 18/02 446/429 |
| 2017/0027271 | A1 * | 2/2017 | Ferencz | A43B 3/36 |

FOREIGN PATENT DOCUMENTS

| | | | |
|---|---|---|---|
| KR | 101382963 | B1 * | 4/2014 |
| KR | 102120597 | B1 * | 6/2020 |
| WO | WO-2007130117 | A1 * | 11/2007 ............ A63H 18/08 |

* cited by examiner

CHILDREN'S SHOE WITH MOTORIZED ACCESSORY SYSTEM

FIELD OF THE PRESENT INVENTION

The present invention relates to the field of augmented and/or customized footwear, and more specifically relates to a new form of children's shoe equipped with at least one accessory outfitted on a motorized track to facilitate movement to the at least one accessory.

BACKGROUND OF THE PRESENT INVENTION

Footwear is known to be available in a wide array of shapes, colors, sizes, and textures, especially for young children, who are prone to enjoy variations in bright colors, textures, lights, and sometimes stationary accessories. Such stationary accessories may be purchased and added to many types of shoes, including laced shoes, Croc™ shoes, Velcro™ shoes, and slip-ons.

Unfortunately, accessories available for these footwear platforms are stationary, often amounting to pins, clips, zipper pulls, or, in the case of Crocs, hole-fillers. None of these accessories are capable of interaction or movement with the child, and are therefore static until repositioned or removed intentionally. If there were a footwear platform, geared towards children, which facilitated an animated, motorized accessory, interactive footwear would be even more exciting and enticing for children.

Thus, there is a need for a new children's shoe platform and accessory system configured to enable the motorized, dynamic movement of at least one accessory across and/or around the face of the shoe. Such a system would preferably employ interchangeable accessories which may be swapped-out by the child or parent to both accessorize the shoes as well as to keep the footwear fresh and the child interested in wearing them rather than begging for new shoes.

SUMMARY OF THE PRESENT INVENTION

The present invention is a new footwear platform apparatus and interchangeable accessory system configured to facilitate dynamic movement of at least one accessory across or around an outer surface of the shoe. The system preferably employs at least one electric motor, powered by a DC power source, to execute the movement of a track around, through, and across the outer surface of the shoe. The track includes a chain disposed within a conduit. The track is preferably equipped with magnets disposed at an assortment of links of the chain which facilitate the attachment of accessories to the chain. Accessories are available in a wide variety of shapes, colors, and sizes, and preferably resemble objects such as vehicles (tiny cars, trucks, planes, trains, etc.), as well as animals with which the child is familiar.

The track of the present invention is preferably configured to be stationary, and is embedded into the fabric and/or structure of the upper sole of the shoe. The chain of the track is highly flexible, which enables it to twist, turn, and wrap around the upper sole of the shoe, forming a complete circuit around which the at least one accessory traverses.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Figures 5A, 5B:
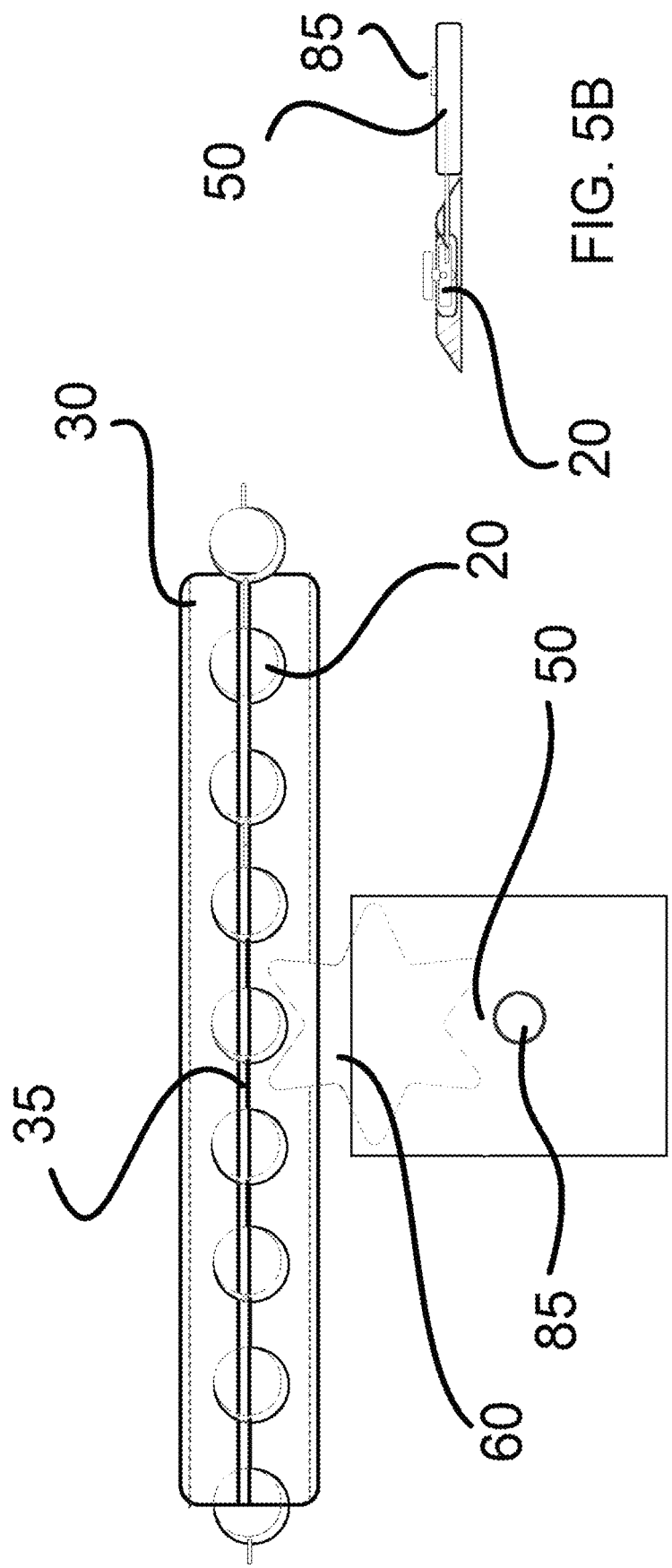
FIG. 5A depicts a view of the chain within the track of the present invention, showing its placement within the track, the groove atop the track, and the connection of the chain to the gear of the motor.
FIG. 5B shows a view of the side of the track with the chain housed inside of the track.

The present invention is a footwear accessory platform and apparatus configured to facilitate the exhibition of at least one accessory (40) disposed in communication with a motorized chain (20) within a track (30) present atop and along the sides of shoes (10) to which the apparatus is integrated. The chain (20) is preferably made of a series of balls which are connected together as shown in FIG. 5. In preferred embodiments of the present invention, the chain (20) is composed of a durable plastic. The track (30), which includes a hollow platform in which the chain (20) may traverse, exhibits a groove (35) which permits the presence of a raised connection mechanism, preferably magnets (70), to traverse the circuit of the track while remaining above the chain (20) within the hollow platform of the track (30). The preferred embodiment of the present invention includes a motor (50), at least one gear (60), magnets (70) disposed in communication with the balls of the chain (20), a battery compartment (80), and a power source (90) disposed within the battery compartment (80).

Figure 1:
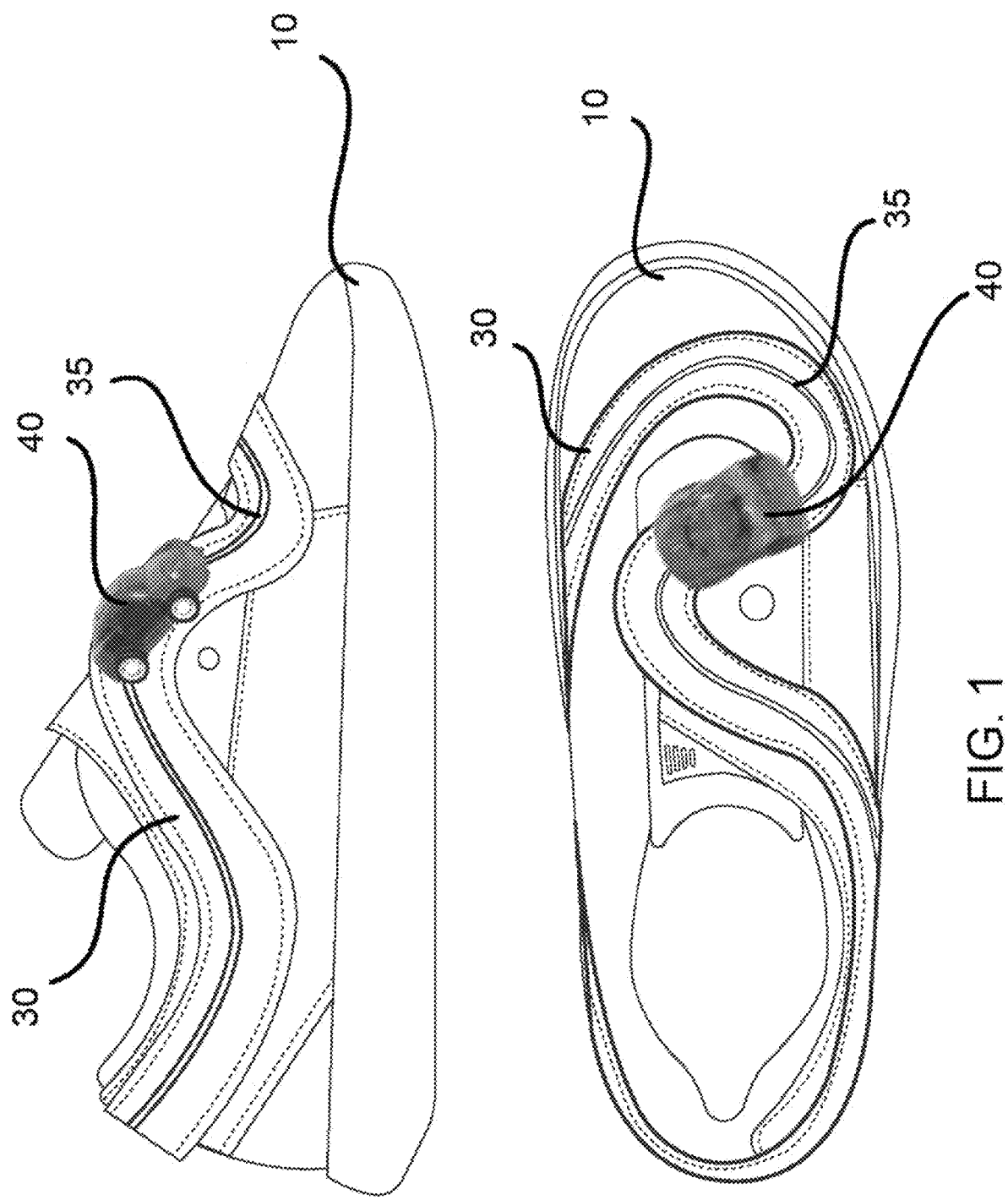
FIG. 1 depicts a views of the preferred embodiment of the apparatus of the present invention as seen from the front and from the side.
Figure 2:
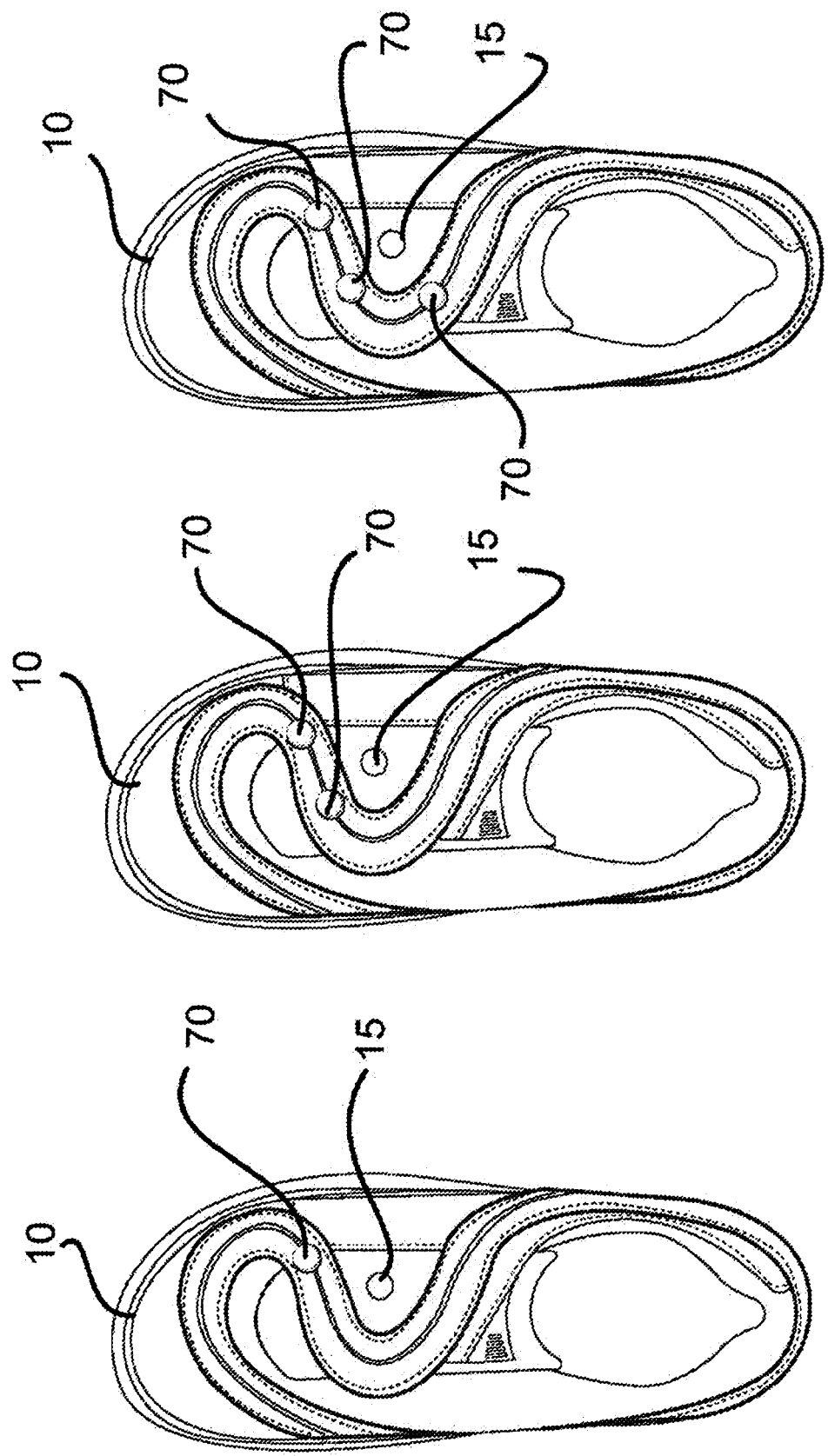
FIG. 2 exhibits a view of three embodiments of the track of the present invention, showing a singular platform, dual platform, and multiple platform embodiment.

The battery compartment (80) is preferably integrated into a housing (95) which also houses the motor (50) and the at least one gear (60). The at least one gear (60) is configured to interface with the chain (20) to provide the means of motion to the chain (30) around the circuitous track (30). As such, the at least one gear (60) is disposed in direct communication with the chain (20) at all times. The motor (50) is connected to the power source (90) of the battery compartment (80) via wires (85) which are preferably encased within the housing (95). Upon activation of the motor (50) via an "On/off" switch (85), the chain (20) moves, thereby moving all accessories (40) connected to the chain (20). The bulk of the accessories (40) remain above the chain (20), resting on or hovering above the track (30) as shown in FIG. 1. The "on/off" switch (85) is preferably present on the top of the housing (95), and is convex to allow it to be easily located. The "on/off" switch (85) is preferably covered by an overlay material, and is present in the tongue area of the shoe (10).

Figure 4:
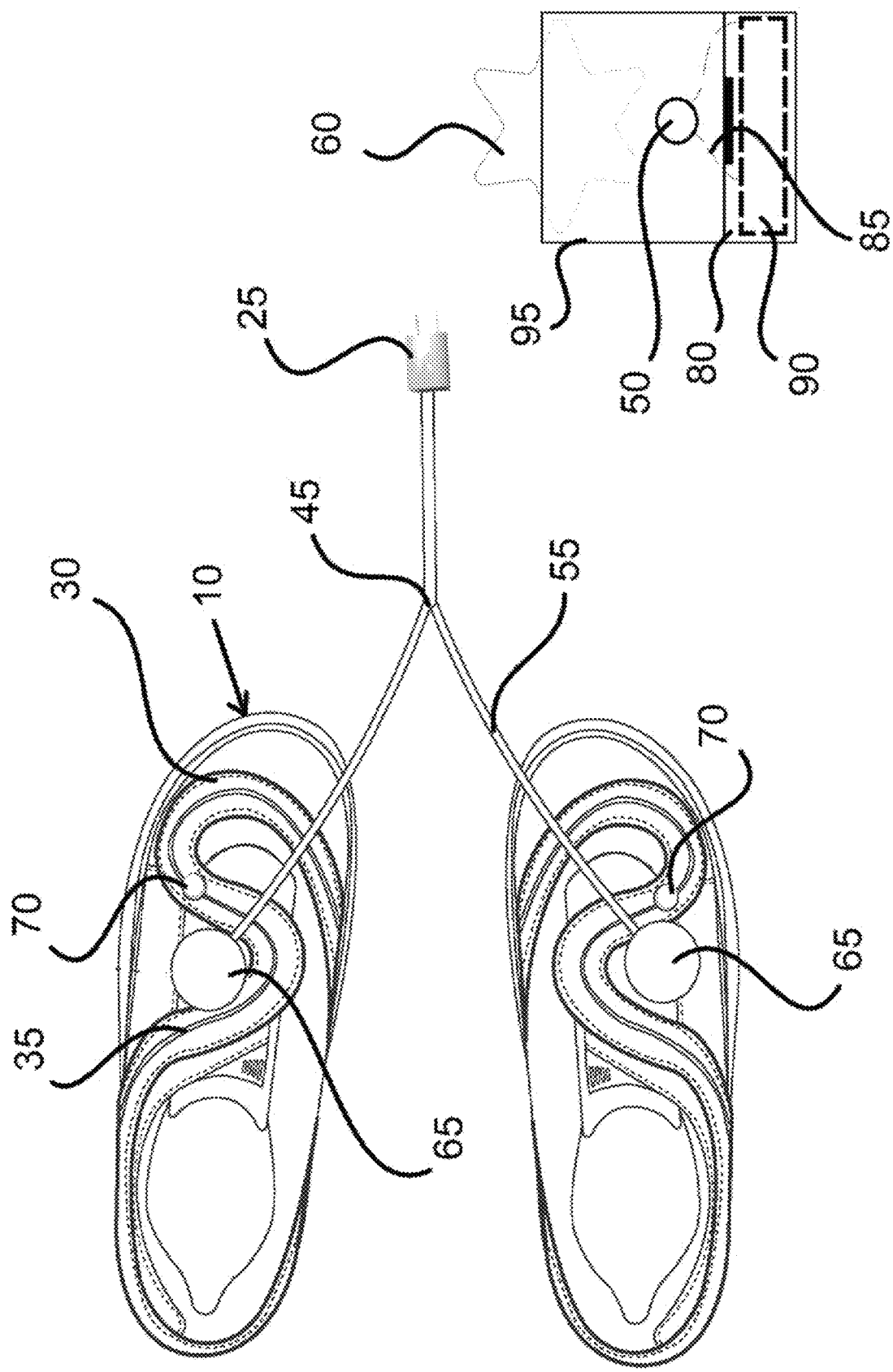
FIG. 4 details a view of the gear box, battery layout and charging mechanism of the apparatus of the present invention as seen from above.

The power source (90) of the present invention is preferably at least one rechargeable battery which may be replaced by the user if needed. Alternately, non-rechargeable batteries may be employed in some embodiments of the present invention. The power source (90) is preferably recharged via an induction or magnetic charger (65) as shown in FIG. 4. A charging wire (55) is equipped with a Y-split (45) to enable charging of the power source (90) of both shoes (10) simultaneously from a single charging adapter (25). The magnetic charger (65) preferably attaches to the apparatus via a charger connector (15) present on the top of the shoe (10). The charger connector (15) is preferably near or under the "on/off" switch (85). The charging adapter (25) of the present invention is preferably equipped with LED lights which indicate the present battery level for each power source, the LED lights corresponding to the battery level of the power source within the "left shoe" and the "right shoe" respectively. In some embodiments of the present invention, it is envisioned that the charger (65) be configured to charge internal batteries of the accessory (40) as well, facilitating power to internal lights, headlights, or similar accent lighting on the accessory (40) itself.

Figure 3:
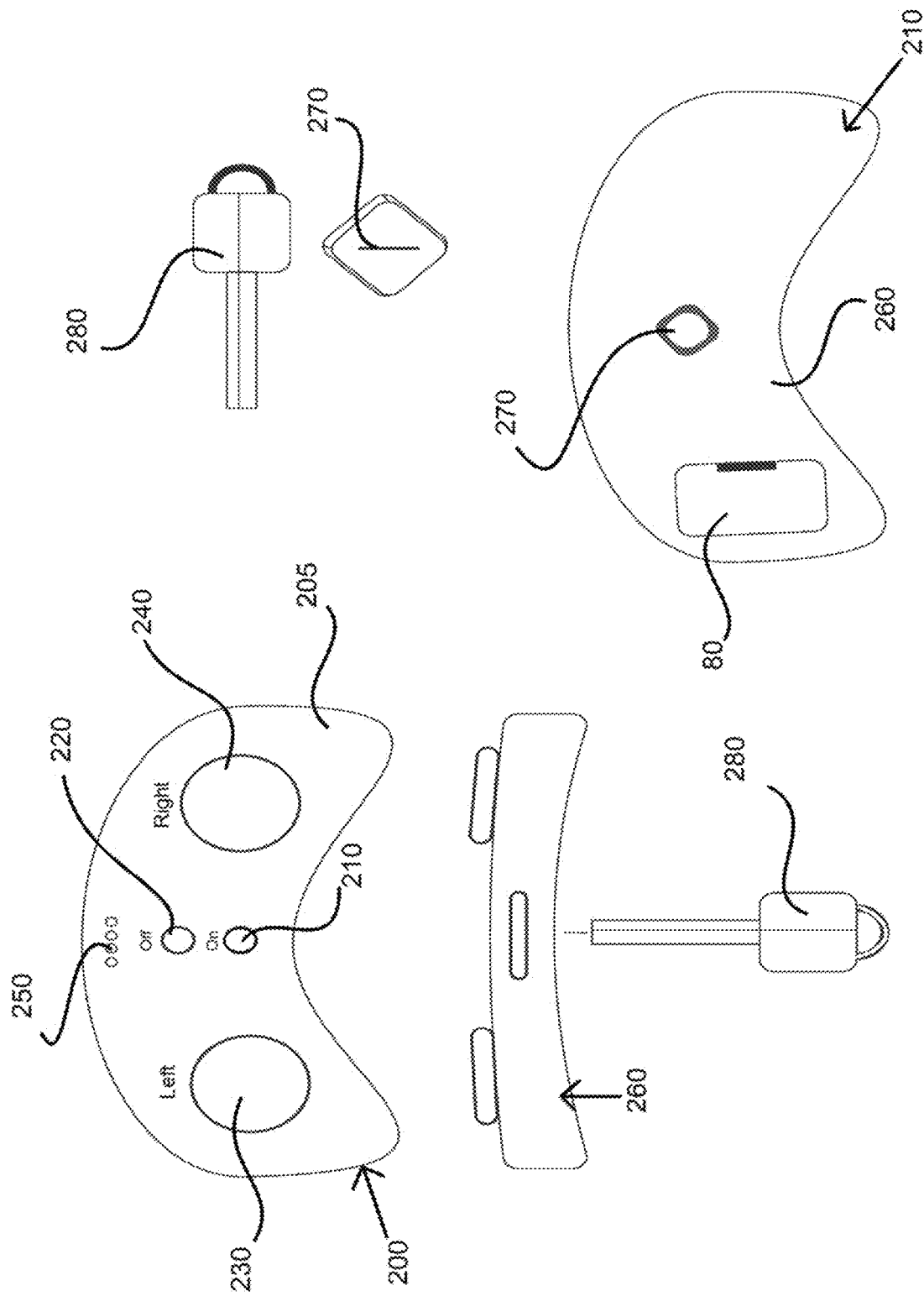
FIG. 3 depicts a view of the remote controller of the present invention and associated parental lock key.

The preferred embodiment of the present invention is preferably equipped with a remote controller (200) which is configured to enable the user to control both the accessory (40) disposed on the right and left shoes (10) independently from the same controller. As shown in FIG. 3, a front (204) of the remote controller (200) is equipped with an "on" button (210), "off" button (220), left power button (230), and right power button (240). The right power button (240) activates movement of the chain (20) of the right shoe (10), moving the accessory (40). Similarly, the left power button (230) activates movement of the chain (20) of the left shoe (10), moving the accessory (40). A speaker (250) is preferably present within the remote controller (200) which enables playback of music and sound effects as desired by the user. It is envisioned that the remote controller (200) be equipped with internal or removable flash memory to facilitate the storage of favorite songs, sound effects, and voice recordings to be played back at the discretion of the user during play.

It should also be noted that the remote controller (200) of the present invention is preferably configured to charge via the same charger (65), and therefore is preferably equipped with a charger connector (15). Alternately, a USB port, such as USB-A, USB-C, Micro-USB, Mini-USB, or similar low-voltage, data-capable port may be present on the remote controller (200) to enable the user to easily add songs, sound effects, and similar audio expressions to internal memory of the remote controller (200) for playback during use of the present invention.

The remote controller (200) exhibits a controller housing (260) which contains a battery compartment (80) which houses the power source (90) of the remote controller (200). A rear (210) of the remote controller (200) is equipped with a parental keyhole (270) which is configured to receive a parental key (280) to facilitate the locking and unlocking of the remote controller (200). The parental key (280) helps to ensure that the child does not play with (i.e. activate the motor) the apparatus at certain times, such as during a church service, at school, or other pertinent locations/times.

Figure 8:
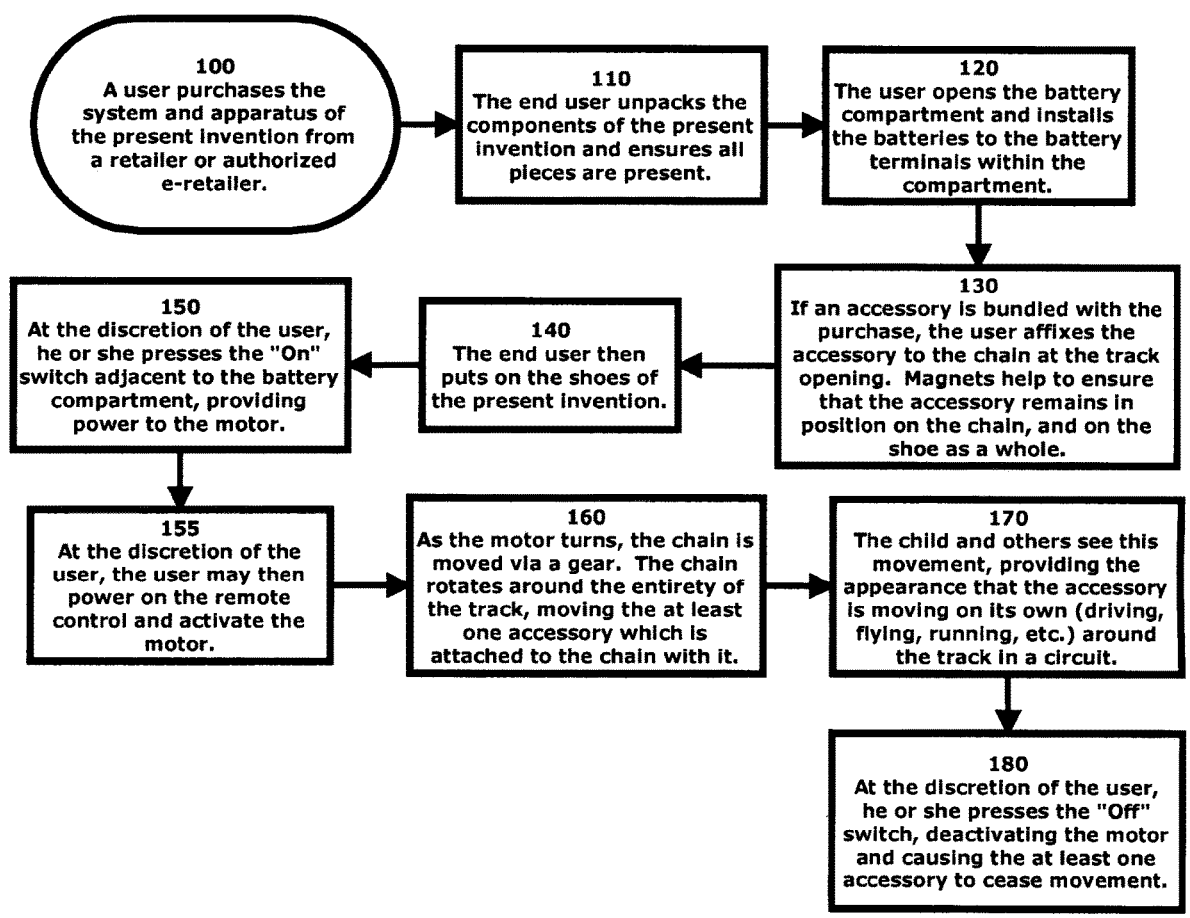
FIG. 8 shows a flow chart detailing the process of use of the present invention by a user and/or parent.

The process of installation and use of the system and apparatus of the present invention, as shown in FIG. 8, is preferably as follows:

1. A user purchases the system and apparatus of the present invention from a retailer or authorized e-retailer. (100) The user purchases a shoe size suitably fitted for the end user (child).
2. The end user unpacks the components of the present invention and ensures all pieces are present. (110)
3. The user opens the battery compartment and installs the batteries to the battery terminals within the compartment. (120) Batteries may be included with the initial purchase in some embodiments. Alternate embodiments may employ a rechargeable battery pack, in which case the user is instructed to charge the battery prior to first use of the present invention.
4. If an accessory is bundled with the purchase, the user affixes the accessory to the chain at the track opening. Magnets help to ensure that the accessory remains in position on the chain, and on the shoe as a whole. (130)
5. The end user then puts on the shoes of the present invention. (140)
6. At the discretion of the user, he or she presses the "On" switch adjacent to the battery compartment, providing power to the motor. (150)
7. At the discretion of the user, the user may then power on the remote control and activate the motor. (155)
8. As the motor turns, the chain is moved via a gear. The chain rotates around the entirety of the track, moving the at least one accessory which is attached to the chain with it. (160)
9. The child and others see this movement, providing the appearance that the accessory is moving on its own (driving, flying, running, etc.) around the track in a circuit. (170)
10. At the discretion of the user, he or she presses the "Off" switch, deactivating the motor and causing the at least one accessory to cease movement. (180)

In some embodiments of the present invention, the accessories (40) are preferably configured as a set, facilitating the appearance of coordination or competition as they traverse the track (30). For example, an optional add-on purchase may include a cat-shaped accessory and a dog-shaped accessory, so that they can provide the appearance that they are chasing each other around the track (30). Alternately, a different set of accessories (40) available for purchase may be shaped like racecars to provide the appearance that they are racing around the track.

It should be noted that the track (30) of the present invention may be present in one of a variety of shapes, and is not limited to the track shape shown in FIG. 1. For example, the track (40) may alternately exhibit the shape of an ellipse, circle, rounded square, rounded rectangle, etc. Additionally, it should be noted that the accessory (40) of the present invention may be removed from the track (30) and placed on an external track so that it may be played with conventionally, away from the upper sole of the shoe.

Accessories (40) compatible with the present invention may be equipped with glow in the dark components, interior and/or exterior lighting, moving wheels, pivoting limbs, and other one or more moving parts. It is envisioned that the accessories (40) be made available in a wide variety of shapes, sizes, colors, and materials to facilitate the enjoyment of the present invention by both boys and girls of all ages. Accessories (40) exhibiting interior or exterior lighting, such as headlights on accessories (40) shaped like vehicles, are preferably powered by the track itself. Therefore, in such embodiments, the magnets (70) are preferably functional conductors of low voltage electricity, capable of conveying DC power from the power source (90) to the accessories (40) to facilitate the illumination of small headlights, interior lights, and similar design flourishes.

It should be noted that the shoe (10) exhibiting the accessory platform of the present invention may be equipped with an array of designs, patterns, and flourishes within the fabric, or printed on the track (30) itself to accentuate the features of the present invention. For example, the track (30) may be equipped with phosphorescent stitching along sides of the track (30), making it easier to view the movement of the accessory (40) in the dark. Similarly, specifically placed stitching on or near the track (30) can make the track (30) appear more like a real road which is useful when the intended accessory option are vehicles.

Figure 7:
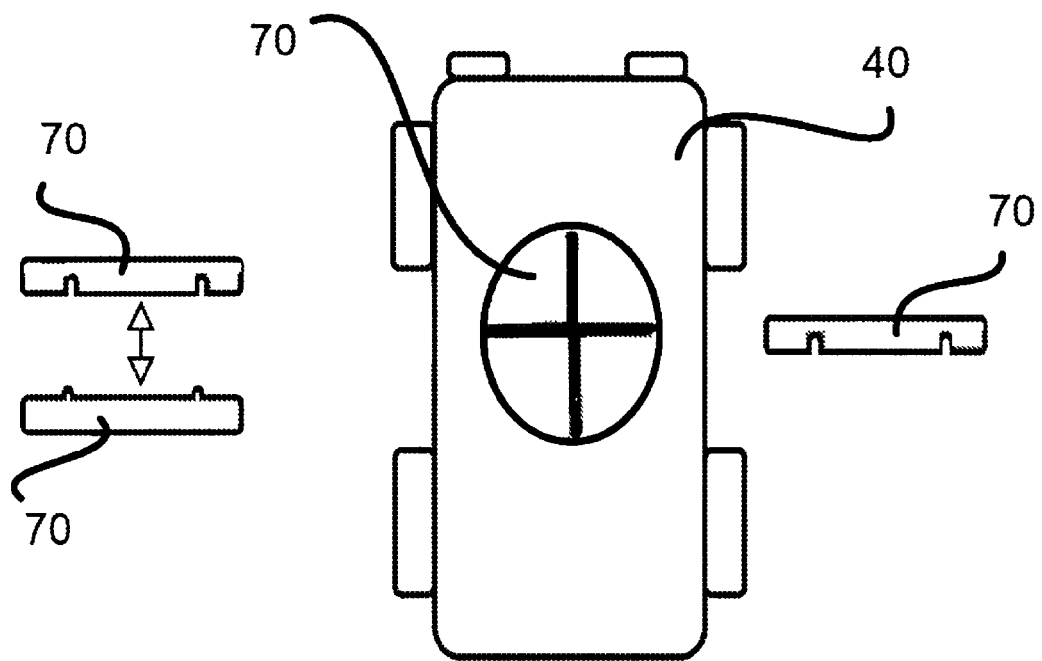
FIG. 7 exhibits a view of the magnets of the present invention, including the magnet on a bottom of the accessory, and the magnet present in communication with the chain of the track of the present invention.

It should also be noted that the magnets (70) of the track (30) of the present invention are configured to interlock with a magnet (70) present on the bottom of each accessory (40). On the magnet (70) of the track (30), a convex "X" shape is present. On the magnet (70) of the accessory (40), a concave "X" shape is present. Upon connection of the magnet (70) of the accessory (40) to the magnet (70) of the track (30), the concave "X" shape of the accessory (40) receives the convex "X" shape of the track (30), interlocking the two components together more firmly than magnetism alone. This feature helps to minimize slippage, and helps to ensure that the accessory (40) remains in place on the track (30) even while the child is running or jumping. These features of the magnets (70) can be seen in FIG. 7.

Figures 6A, 6B:
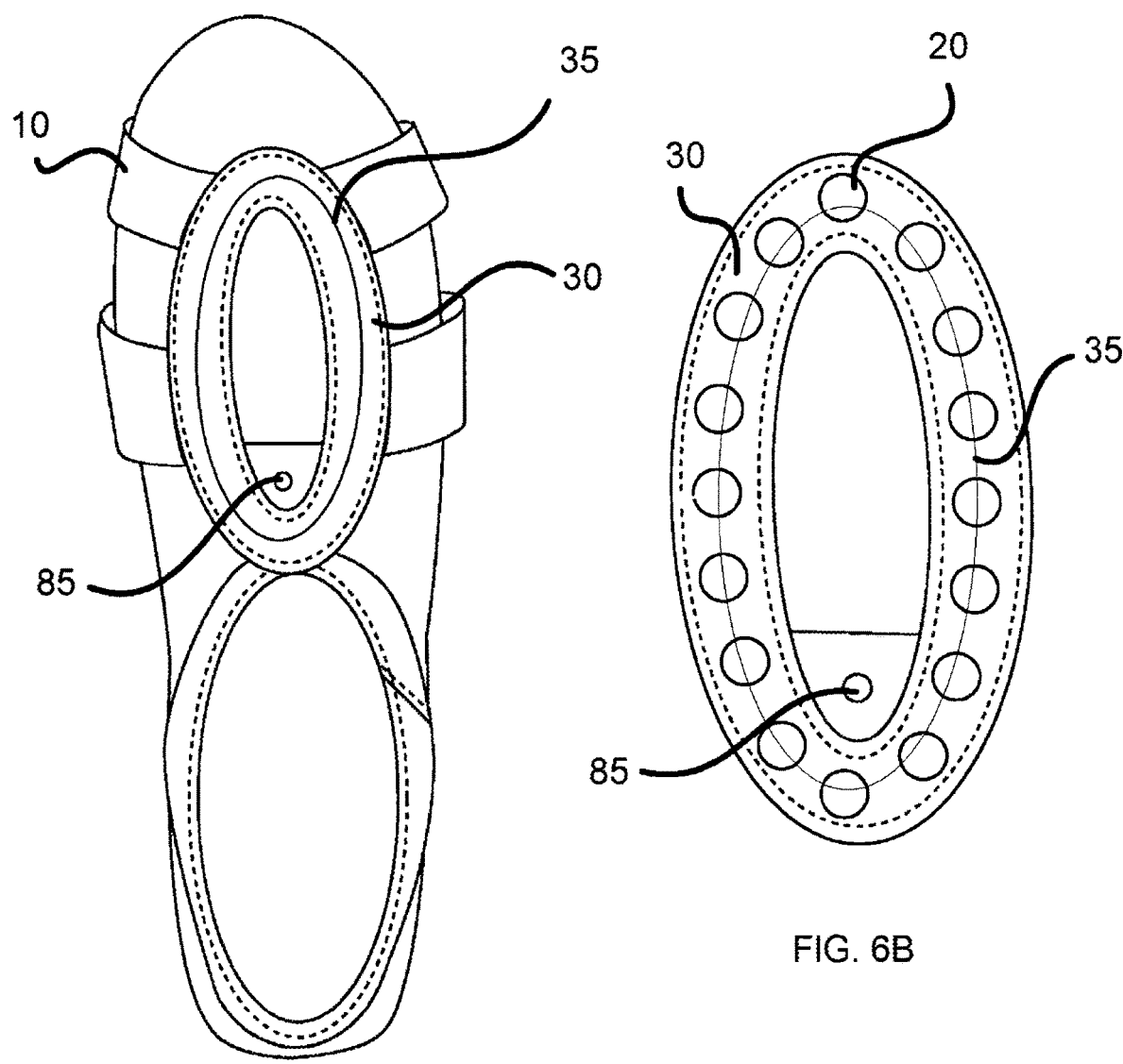
FIG. 6A details a view of an alternate embodiment of the present invention, showing an oval-shaped track disposed on a sandal equipped with the system of the present invention.
FIG. 6B depicts a view of the track of the present invention removed from the sandal in the removable track embodiment of the present invention.

In some alternate embodiments of the present invention, the track (30), including the chain (20), may be removed from the shoe or sandal, as shown in FIG. 6. In such embodiments, the track is preferably affixed to a hook-and-loop fastener such as Velcro™ which is equal in width to that of the track (30) itself. The hook-and-loop fastener enables one to easily remove the track such that it may be replaced with a faceplate if desired. The faceplate is preferably configured to provide an aesthetic coherence to the shoe (10) or sandal, covering the hook-and-loop fastener disposed on the shoe (10) or sandal itself. Removal of the track (30) via the hook-and-loop fastener allows the shoe (10) or sandal to be washed. This embodiment is in contrast to the preferred embodiment of the present invention which has the track (30) permanently stitched into the fabric of the shoe (10), which is helpful in the event the child may lose the components of the present invention.

It should be noted that the preferred embodiment of the present invention is equipped with at least one gasket configured to afford the system of the present invention a degree of water-resistance. The at least one gasket is preferably disposed in communication with the door of the battery compartment. As such, the present invention is designed such that it does not break when exposed to rain, puddles, or other light sources of water.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:
1. A modular accessory system implemented on each of a right shoe and a left shoe of a pair of shoes, each shoe comprising:
   a track, said track forming a circuit around an upper sole of the shoe;
   a chain, said chain disposed within a cavity directly under said track;
   a groove, said groove amounting to a gap centrally disposed on said track above said chain;
   an electric motor;
   a power source, said power source disposed in communication with said motor;
   wherein said power source is disposed within a battery compartment;
   at least one gear, said at least one gear disposed in communication with said chain and said motor;
   at least one accessory;
   a first iteration of at least one magnet, said first iteration of at least one magnet disposed on a bottom of said at least one accessory, with positive polarity of said first iteration of at least one magnet facing away from said at least one accessory;
   an accessory mount, said accessory mount extending up and through said groove while remaining in communication with said chain;
   a second iteration of at least one magnet, said second iteration of at least one magnet disposed in communication with said chain via said accessory mount, with negative polarity of said second iteration of at least one magnet facing away from said accessory mount; and wherein said at least one accessory is removably connected to said chain via the connection of the first iteration of at least one magnet to the second iteration of at least one magnet.

2. The modular accessory system of claim 1, wherein for each shoe, said track is permanently stitched to said upper sole of the footwear.

3. The modular accessory system of claim 1, wherein for each shoe, said track is affixed to said upper sole of the footwear via hook-and-loop fasteners.

4. The modular accessory system of claim 1, further comprising for each shoe:
   a switch, said switch configured to activate and deactivate said power supply to said motor;
   wherein said switch is disposed adjacent to said power supply and said motor; and
   wherein upon activation of said switch, electric current is conveyed from said power source to said motor, causing said at least one gear to rotate, and causing said chain to traverse within said cavity of said track.

5. The modular accessory system of claim 1, further comprising for each shoe:
   a charger connector, said charger connector disposed on a tongue region of the shoe;
   wherein said charger connector is configured to receive a charging adapter; and
   wherein said charging adapter is configured to convey DC power to said power source.

6. The modular accessory system of claim 1, further comprising:
   a remote controller, said remote controller wirelessly connected to said motors via at least one wireless radio;
   a right power button of said remote controller, said right power button configured to activate said motor of the right shoe;
   a left power button of said remote controller, said left power button configured to activate said motor of the left shoe; and
   wherein said right power button and said left power button are disposed on a front of a housing of said remote controller.

7. The modular accessory system of claim 1, wherein for each shoe, said battery compartment is water resistant.

8. The modular accessory system of claim 1, further comprising for each shoe:
   a battery charger, said battery charger configured to recharge said power source from AC power via an AC/DC adapter;
   a charger connector, said charger connector disposed on a top of the shoe, adjacent to said power source; and
   wherein said charger connector is configured to receive said battery charger via a magnetic charger of said battery charger.

9. The modular accessory system of claim 2, further comprising for each shoe:
   a switch, said switch configured to activate and deactivate said power supply to said motor;
   wherein said switch is disposed adjacent to said power supply and said motor; and
   wherein upon activation of said switch, electric current is conveyed from said power source to said motor, causing said at least one gear to rotate, and causing said chain to traverse within said cavity of said track.

10. The modular accessory system of claim 3, further comprising for each shoe:
    a switch, said switch configured to activate and deactivate said power supply to said motor;
    wherein said switch is disposed adjacent to said power supply and said motor; and
    wherein upon activation of said switch, electric current is conveyed from said power source to said motor, causing said at least one gear to rotate, and causing said chain to traverse within said cavity of said track.

11. The modular accessory system of claim 10, further comprising:
    a remote controller, said remote controller wirelessly connected to said motors via at least one wireless radio;
    a right power button of said remote controller, said right power button configured to activate said motor of the right shoe;
    a left power button of said remote controller, said left power button configured to activate said motor of a the left shoe; and
    wherein said right power button and said left power button are disposed on a front of a housing of said remote controller.

12. The modular accessory system of claim 10, further comprising for each shoe:
    a battery charger, said battery charger configured to recharge said power source from AC power via an AC/DC adapter;
    a charger connector, said charger connector disposed on a top of the shoe, adjacent to said power source; and
    wherein said charger connector is configured to receive said battery charger via a magnetic charger of said battery charger.

13. A modular accessory system implemented on each of a right and a left shoe of a pair of shoes comprising for each shoe:
    a track, said track forming a circuit around an upper sole of the shoe;
    a chain, said chain disposed within a cavity directly under said track;
    a groove, said groove amounting to a gap centrally disposed on said track above said chain;
    an electric motor;
    a power source, said power source disposed in communication with said motor;
    wherein said power source is disposed within a battery compartment;
    at least one gear, said at least one gear disposed in communication with said chain and said motor;
    at least one accessory;
    a first iteration of at least one magnet, said first iteration of at least one magnet disposed on a bottom of said at least one accessory such that a positive pole of said first iteration of at least one magnet is pointing away from said bottom of said at least one accessory;
    an accessory mount, said accessory mount extending up and through said groove while remaining in communication with said chain;
    a second iteration of at least one magnet, said second iteration of at least one magnet disposed in communication with said chain via said accessory mount;
    wherein said second iteration of at least one magnet is oriented such that a negative pole of said second iteration of at least one magnet is pointed away from said accessory mount;
    wherein said at least one accessory is removably connected to said chain via the connection of the first iteration of at least one magnet to the second iteration of at least one magnet via the interface of said positive pole of said first iteration of at least one magnet to said negative pole of said second iteration of at least one magnet;

a switch, said switch configured to activate and deactivate said power supply to said motor;

wherein said switch is disposed adjacent to said power supply and said motor;

wherein upon activation of said switch, electric current is conveyed from said power source to said motor, causing said at least one gear to rotate, and causing said chain to traverse within said cavity of said track;

a charger connector, said charger connector disposed on a tongue region of the shoe;

wherein said charger connector is configured to receive a charging adapter;

wherein said charging adapter is configured to convey DC power to said power source;

a remote controller, said remote controller wirelessly connected to said motors via at least one wireless radio;

a right power button of said remote controller, said right power button configured to activate said motor of the right shoe;

a left power button of said remote controller, said left power button configured to activate said motor of the left shoe;

wherein said right power button and said left power button are disposed on a front of a housing of said remote controller;

wherein said battery compartment is water-resistant;

a battery charger, said battery charger configured to recharge said power source from AC power via an AC/DC adapter; and wherein said charger connector is configured to receive said battery charger via a magnetic charger of said battery charger.

14. The modular accessory system of claim 13, wherein for each shoe, said track is permanently stitched to said upper sole.

15. The modular accessory system of claim 13, wherein for each shoe, said track is affixed to said upper sole via hook-and-loop fasteners.

* * * * *